H. A. IMHOFF, B. F. COOKE & W. A. RHULMAN.
COMBINED GAS FEED AND CARBURETER.
APPLICATION FILED MAR. 30, 1917.
1,254,598.
Patented Jan. 22, 1918.
2 SHEETS—SHEET 1.
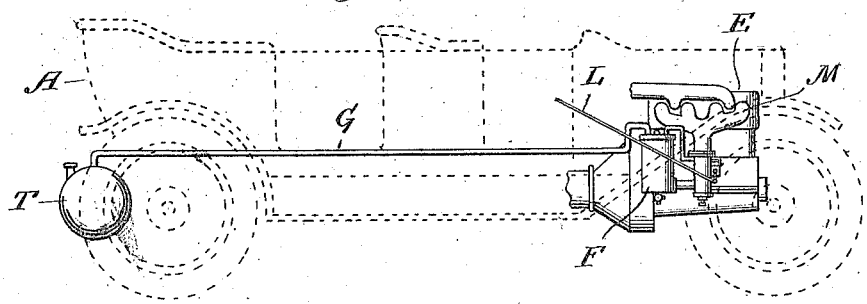
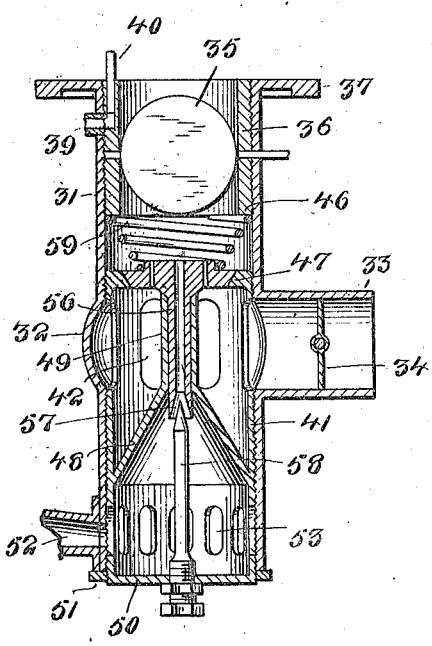
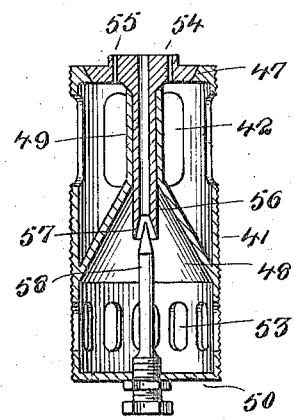
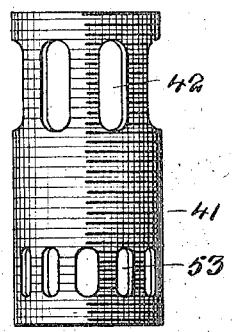
WITNESSES
INVENTORS
H. A. Imhoff
B. F. Cooke
W. A. Rhulman
BY Victor J. Evans
ATTORNEY H. A. IMHOFF, B. F. COOKE & W. A. RHULMAN.
COMBINED GAS FEED AND CARBURETER.
APPLICATION FILED MAR. 30, 1917.
1,254,598.
Patented Jan. 22, 1918.
2 SHEETS—SHEET 2.
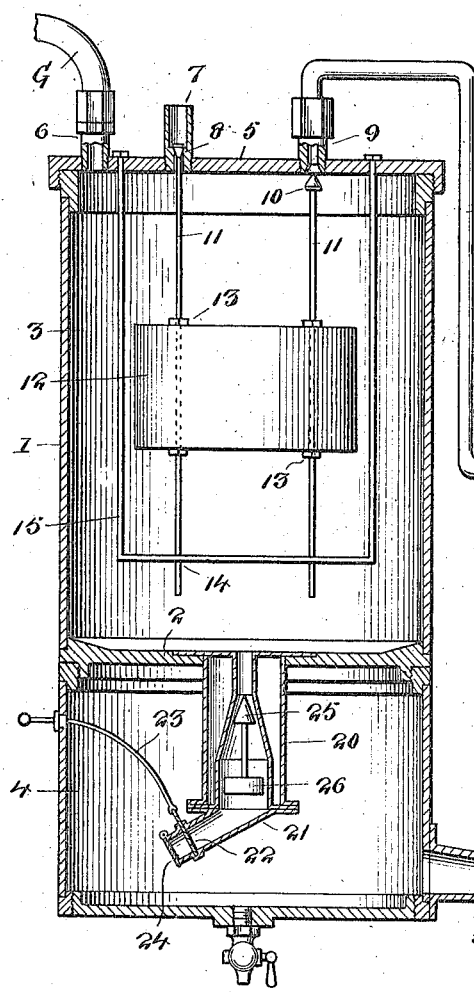
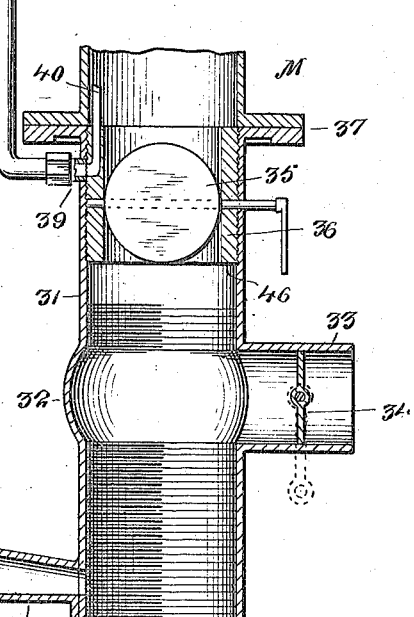
Fig. 2.
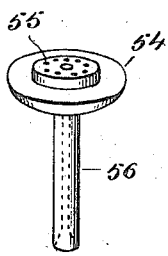
Fig. 6
WITNESSES
INVENTORS
H. A. Imhoff
B. F. Cooke
W. A. Rhulman
BY Victor J. Evans
ATTORNEY

UNITED STATES PATENT OFFICE.

HENRY A. IMHOFF, OF CHILLICOTHE, AND BENGIMAN F. COOKE AND WILLIAM A. RHULMAN, OF HAMDEN, OHIO.

COMBINED GAS-FEED AND CARBURETER.

1,254,598. Specification of Letters Patent. Patented Jan. 22, 1918.

Application filed March 30, 1917. Serial No. 158,669.

*To all whom it may concern:*

Be it known that we, HENRY A. IMHOFF, BENGIMAN F. COOKE, and WILLIAM A. RHULMAN, all citizens of the United States, said IMHOFF residing in Chillicothe, in the county of Ross and State of Ohio, and said COOKE and RHULMAN residing in Hamden, in the county of Vinton and State of Ohio, have invented new and useful Improvements in Combined Gas-Feeds and Carbureters, of which the following is a specification.

This invention relates to fuel feeding for liquid burners, and more especially to devices for maintaining the level of the fluid fuel; and the object of the same is to provide a single device which will act as a carbureter and as a means for feeding fluid fuel to such carbureter from a tank standing at a lower level, and yet maintaining a certain amount of the fluid in reserve in the feeder and automatically controlling the supply of this fuel to the carbureter in the apparatus, no matter what is the position of the automobile as in ascending or descending grades which would have its effect on the flow of fuel from the tank. Other objects are accomplished by the construction, the same being more fully set forth hereinafter and claimed, reference being made to the accompanying drawings wherein:—

Figure 1 is a diagrammatic view of an automobile in dotted lines, showing the relative position of the apparatus which includes our invention, the engine to which it is applied, and the tank or reservoir from which the gasolene is fed.

Fig. 2 is an enlarged sectional view through the entire apparatus with the so-called cage of the carbureter portion thereof omitted, showing more particularly in detail the internal construction of the feeder portion of the apparatus.

Fig. 3 is a sectional detail of the carbureter portion of the apparatus alone, showing the assembly of parts.

Fig. 4 is a sectional detail of the cage portion thereof alone the needle valve being shown open.

Fig. 5 is a view of the cage in side elevation.

Fig. 6 is a perspective detail of the main valve.

In Fig. 1 an automobile A is shown in outline, with a reservoir or tank T at a rather low point with relation to the feeder F which forms the subject-matter of our inventior, G is the line of pipe connecting the tank T with the feeder, E is the engine having an intake manifold M, and L is the connection to the throttle lever on the steering wheel as usual. It will be seen from this view that the entire apparatus is located rather low with reference to and alongside of the engine E, but it is to be assumed that the level of the gasolene within the tank T is yet lower and means are necessary to induce it to flow to the carbureter. We seek to avoid the use of a separate element or so-called pump to produce this flow, and have constructed a combined feeder and carbureter whose casings are shown slightly separated in Fig. 2 but may be built so as to stand closely alongside each other and even be within one casting; and the feeder portion of our device is constructed with especial reference to the carbureter portion thereof, so that there is always a reserve quantity of gasolene within the feeder and the carbureter can never run dry so long as there is liquid fuel within the tank. On this understanding we describe the parts of our invention separately, but wish it understood that they are component parts of a single apparatus.

The feeder comprises an upright casing 1 having an internal transverse partition 2 dividing it into upper and lower compartments 3 and 4. The former is closed by the upper head or end 5 of the casing which carries a nipple 6 for connection with the gas line G, a second nipple constituting an air vent 7 and containing a downwardly closing valve 8, and a third nipple 9 for connection as described below and containing an upwardly closing valve 10. The stems 11 of said valves extend downward into the compartment 3 and through a float 12, to which they may be attached by nuts 13 above and below the float as shown, and the lower ends of said stems are guided in holes 14 in a bail 15 which hangs within the compartment 3 and has its arms supported by the upper end or head 5 as shown. The construction is such that when the float rises the vent 7 is opened and the nipple 9 is closed, but when the float 12 descends the position of the valves is altered. By adjusting the nuts 13 on the stems 11 of the valves, the float 12 may be given lost motion if desired.

Within an opening in the partition 2 is mounted the tubular casing 20 of a valve, which casing has a laterally deflected spout 21 at its lower end, and which spout contains a valve 22 capable of adjustment by means of a handle 23, and an outwardly opening check valve 24 at its lower extremity so that by no possible chance may the gasolene within the compartment 4 flow upward or backward into the compartment 3. Within said casing we have shown a needle valve 25 closing upwardly by means of a float 26 of its own, and this valve will close when the liquid within the compartment is so ample that it rises within the casing 20, or in other words when no more liquid may flow into the compartment. Possibly the needle valve and its float may be dispensed with in view of the check valve 24, but we prefer to employ it in addition thereto.

What might be called the carbureter portion of our device includes an upright casing 31 best seen in Fig. 2 and the cage best seen in Fig. 4, the two being shown assembled in Fig. 3. The casing is by preference cylindrical and enlarged slightly at its midlength as at 32 opposite the air inlet 33, the latter having a valve 34 connected by the rod L with the throttle lever adjacent the steering wheel as usual. This casing is internally threaded throughout most of its length as seen, to engage external threads on the cage of Fig. 4. Its upper end may contain a butterfly valve 35 to be controlled by the accelerator, or this might be the throttle valve connected with the control rod L, and the valve 34 be a choker valve to regulate the air admitted. These details are well known in carbureters, and not necessary of amplification here. However, we would have the casing 36 of the valve 35 screwed into the main casing for a purpose yet to appear. The upper end of the main casing is connected at 37 with the stem of the inlet manifold M as usual, and at some suitable point therein there is an L-shaped nipple 39 whose outer end is connected by a pipe 38 with the nipple 9 of the feeder described above, and whose inner end 40 is directed along the interior of the manifold parallel with the suction set up by the engine. We might say here that this construction is for the purpose of putting suction through the pipe 38 into the upper portion of the compartment 3 of the feeder, and setting up a partial vacuum therein. This vacuum we expect to be sufficient to raise the gasolene out of the tank T and draw it along the gas line G. As the valves 8 and 10 move with the float 12, when the latter rises to open the vent 7 the suction would be destroyed, even if it were not for the fact that the valve 10 closes the nipple 9 and therefore cuts off further suction. On the other hand, when the float 12 descends as it will when the gasolene is consumed to a considerable extent within the compartment 3, the valve 8 closes the air vent 7 and the valve 10 opens the nipple 9 so that suction is reestablished and the vacuum draws gasolene from the tank.

Therefore we consider it important that the nipple 39 shall be L-shaped, or at least that its inner end 40 shall be directed along and into the manifold M in the line of suction set up therein by the engine, and we use this suction in the feed of the liquid fuel. As stated first above, however, there is a compartment 4 in our feeder which always contains a charge of gasolene amply sufficient to run the engine for a considerable time, and therefore when the engine is started with the compartment 3 empty the fuel within the compartment 4 is sufficient to permit the engine to set up suction and fill the compartment 3 to a point where it will replenish that used out of the compartment 4.

The so-called "cage" best seen in Fig. 4 is a skeleton structure removably and adjustably inserted into the casing 31 from its lower end and serving as a support for the main valve of the carbureter. This comprises a shell 41 having copious upright openings 42 in its side opposite the enlargement 32 and the air inlet 33; its upper end stands at some distance below the shoulder 46 at the lower end of the upper valve casing 36, and said upper end has a downwardly tapering opening which is ground to form a valve seat 47; its body contains an upwardly tapering conical partition 48 with a tubular guide 49 rising from the truncated apex thereof to a point just below the valve seat 47; and its lower end is closed as at 50 excepting for a central opening whose use will yet be explained. The entire cage is screwed upward into the casing 31, whose lower end is closed thereby, and a check nut 51 may well be run onto the projecting lower end of the cage to hold it after it has been inserted into the casing. The latter near its lower extremity is connected by a pipe or union 52 with the lower compartment 4 in the feeder, and although this union is shown as of some little length, the carbureter casing and feeder casing may stand side by side or may even be integral so that the connection is merely a hole through the two casings or through the partition which would exist between them if they are cast in one member. The cage is provided around its lower end with openings 53, one of which is always in register with the pipe or union 52 so that gasolene may flow freely into the interior of the cage below its partition 48. The main gasolene valve has a head 54 which is ground to fit on the valve seat 47 and provided with a series of fine ports 55 through it sufficient to admit enough air for running the engine at low speed, and the stem 56 of this valve is tubular and depends from its head through the guide 49, its lower end being flared as shown at 57. Threaded upward through a hole in the lower end 50 of the cage is a needle valve 58 which stands beneath the partition 48 in the gasolene chamber, and whose tapered upper end coacts with the flared lower end 57 of the valve just mentioned. Finally a spring 59 has its upper convolution resting against the shoulder 46 and its lower convolution upon the valve head 54, whereby the latter is held closed upon the seat 47 with a tension which is regulated by the distance the cage is screwed upward into the casing 31. The position of the partition 48 is such that air is admitted through the openings 42 above it, and into the space around the tubular guide 49, always through the ports 55 even when the valve 54 is closed, and also through the uncovered seat 47 when the valve is raised; and meanwhile gasolene admitted from the feeder into the space below the partition 48, is permitted to flow upward through the tubular stem 56 only when the valve rises off the point of the needle 58; therefore adjustment of the needle valve at the bottom of the cage is an important feature of this carbureter. Once the parts are adjusted, however, they need no further attention throughout the season.

With the above construction, the parts being connected up as described, the operation is as follows: Let us assume that there is a considerable charge of gasolene within the compartment 4, which of course flows through the pipe or union 52 and rises to an equal level within the cage beneath its partition 48. When now the engine is started, the suction thereof through the manifold M raises the main valve 54 slightly off its seat 47 and the lower end 57 of its stem 56 off the tip of the needle 58, so that gasolene flows in through the bore of the stem and air flows around the head of this valve. These fluids mix within the manifold, and the proper mixture is supplied to the cylinders. Thereafter the admission of air can be controlled by the valve 34 or the valve 35, and the admission of gasolene can be controlled by setting the needle valve 58; but the important feature to be observed is that a charge of gasolene within the compartment 4 is sufficient to permit the starting of the engine and its running for a considerable length of time. As soon as it begins to run, suction is set up at 40 through the pipe 38 and a partial vacuum is created within the compartment 3, the needle valve 25 possibly at this time closing upward as the vacuum is created. Assuming that there is no gasolene within the compartment 3, then the float 12 has dropped and the small valve 8 has closed the air vent 7 whereas the small valve 10 opens the inlet through 38 to the suction generated at 40. The vacuum draws on the gasolene through the pipe or gas line G, and gasolene flows from the tank T along this line and into the compartment 3. When it has accumulated sufficiently therein to raise the float 12, suction is cut off by closure of the small valve 10 and the compartment is vented at 7, and more gasolene will not be drawn through the gas line G until the float 12 again falls. The weight of the gasolene within this compartment will now depress and open the float valve 25 as soon as sufficient gasolene within the lower compartment 4 has been drawn out of the same by the carbureter, and therefore the upper compartment supplies the lower. The hand valve 22 and check valve 24 prevent the possible escape of gasolene within the lower compartment upward to the upper compartment, even though the float valve 25 did not serve in this capacity. It will thus be seen that by having the inner end of the L-shaped nipple 39 above the main valve 54 and within the manifold M, the suction in the latter may be utilized to draw gasolene through the pipe G although the tank T is located at a lower level than the feeder, as is the case in some makes of automobiles; and yet the construction herein is such that when the machine has been idle for a long time and there is no gasolene whatever within the compartment 3, there will always be enough in the compartment 4 to permit the starting of the engine and the setting up of suction which produces the feed. As above suggested, if the casings of the feeder and the carbureter are very closely disposed or intimately connected, or even if they are formed in one, the entire device may be applied to the ordinary automobile in the place now occupied by its carbureter, and the gas line G connected with the nipple 6 instead of the carbureter itself; and, after adjustment has once been effected, the device will need no further attention. For this purpose hot air from the outlet manifold may be supplied to the air inlet 33 in the winter time if desired. Although we have shown the throttle control L as leading to the valve 34, as above suggested it might lead to the valve 35. In other words, either valve may be the throttle and the other the choker. Other details are not necessary of further description, and we do not wish to be limited thereto.

What is claimed as new is:—

1. The herein described combined liquid fuel feeder and carbureter, the same comprising a feeder portion having an upright casing with an internal partition dividing it into upper and lower compartments, a connection between said compartments having a check valve, a gas line connecting the upper compartment with a remote fuel tank at a lower level, and a float in this compartment; and the carbureter portion having an upright casing connected at its lower end with a low point in the lowermost of said compartments and at its upper end with the inlet manifold, regulated means for admitting air, a main valve, an L-shaped nipple in said casing between the main valve and manifold and with its inner end directed toward the engine, a nipple on the body of the feeder connected with the outer end of said L-shaped nipple, and a valve in the feeder-nipple controlled by its float.

2. The herein described combined liquid fuel feeder and carbureter, the same comprising a feeder portion having an upright casing with an internal partition dividing it into upper and lower compartments, said partition having a hole, a valve casing depending from the partition around said hole and deflected at its lower end into an oblique spout, a check valve at the lower end of said spout, a needle valve and its float within said casing above the spout, the float causing this valve to close upwardly, a gas line connecting the upper compartment with a remote fuel tank standing at a lower level, a nipple in the top of this compartment, and a valve in said nipple closed by the rise of a liquid within the compartment; and the carbureter portion having a casing connected at its lower end with said lower compartment below the check valve in the latter and at its upper end with the inlet manifold, means for regulating the volume of air and liquid fuel admitted, a main valve, and connections between the casing adjacent said main valve and the nipple on the feeder casing, for the purpose set forth.

3. The herein described combined liquid fuel feeder and carbureter, the same comprising a feeder portion having an upright casing with an internal partition dividing it into upper and lower compartments, said partition having a hole, a valve casing depending from the partition around said hole and deflected at its lower end into an oblique spout, a check valve at the lower end of said spout, a hand valve within the spout, a handle on the exterior of the casing controlling this valve, a needle valve and its float within said casing above the spout, the float causing this valve to close upwardly, a gas line connecting the upper compartment with a remote fuel tank standing at a lower level, a nipple in the top of this compartment, and a valve in said nipple closed by the rise of the liquid within the compartment; and the carbureter portion having a casing connected at its lower end with said lower compartment below the check valve in the latter and at its upper end with the inlet manifold, a main valve, and connections between the casing adjacent said main valve and the nipple on the feeder casing, for the purpose set forth.

4. The herein described liquid fuel feeder for internal combustion engines, the same comprising an upright casing having a transverse partition dividing it into upper and lower compartments, connections between its lower compartment and the carbureter and between the carbureter and the intake manifold, connections between its upper compartment and a remote source of liquid fuel standing at a lower level, connections between its upper compartment and the manifold for creating a partial vacuum in the former by means of the suction in the latter, means for closing said connections as the liquid in this compartment rises, an upwardly closing float valve whose casing opens through said partition and stands within the lower compartment and whose lower end is deflected into a spout, a check valve on said spout, and a float within said casing controlling the closing of the valve by the rising of the liquid within the lower compartment.

5. In a fuel feeder for internal combustion engines, the combination with an upright casing whose upper end contains three nipples, whose body contains a transverse partition pierced with an opening, whose lower end is closed, and whose lower portion is connected with the carbureter; of an upwardly closing valve in the opening of said transverse partition, a gas line leading from one of said nipples to a fuel tank located at a lower level, a downwardly closing air valve in one of the remaining nipples and an upwardly closing valve in the other, connections between the last named nipple and the inlet manifold of the engine, a bail hanging from the upper head of the casing within the same above its partition, rods depending from said valves and slidably mounted in the lower portion of the bail, nuts on said rods, and a float mounted on them between said nuts, the whole for use substantially as described.

In testimony whereof, we affix our signatures.

WILLIAM A. RHULMAN.
HENRY A. IMHOFF.
BENGIMAN F. COOKE.